(12) United States Patent
Sun et al.

(10) Patent No.: US 7,583,984 B2
(45) Date of Patent: Sep. 1, 2009

(54) METHOD OF PROVIDING NOTIFICATION FOR BATTERY POWER CONSERVATION IN A WIRELESS SYSTEM

(75) Inventors: Li-Hsiang Sun, San Diego, CA (US); Suk Woo Lee, San Diego, CA (US); Young Cheul Yoon, San Diego, CA (US); Sang Gook Kim, San Diego, CA (US); Shu Wang, San Diego, CA (US); Hobin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 11/464,150

(22) Filed: Aug. 11, 2006

(65) Prior Publication Data

US 2007/0057767 A1  Mar. 15, 2007

Related U.S. Application Data

(60) Provisional application No. 60/707,919, filed on Aug. 12, 2005.

(51) Int. Cl.
*H04B 1/16* (2006.01)
*H04M 1/725* (2006.01)

(52) U.S. Cl. .................. 455/572; 455/127.5; 455/343.1; 455/412.2; 455/574; 340/7.32

(58) Field of Classification Search ... 455/343.1–343.5, 455/412.1, 522, 572, 574, 127.5; 340/7.32–7.38, 340/539.3
See application file for complete search history.

(56) References Cited

U.S. PATENT DOCUMENTS

| 6,072,784 | A  | * | 6/2000  | Agrawal et al. ............. 370/311 |
| 6,697,617 | B2 | * | 2/2004  | Liebenow .................... 455/425 |
| 6,970,710 | B1 | * | 11/2005 | Kikuchi ...................... 455/462 |
| 7,010,329 | B2 | * | 3/2006  | Livet et al. ................... 455/574 |
| 7,050,829 | B2 | * | 5/2006  | Motohashi ............... 455/556.1 |
| 7,395,097 | B2 | * | 7/2008  | Perdomo et al. ........... 455/574 |
| 7,433,702 | B2 | * | 10/2008 | Lindskog et al. ............ 455/522 |
| 2005/0018624 | A1 | * | 1/2005 | Meier et al. ................. 370/318 |
| 2005/0036464 | A1 |   | 2/2005 | Rajkotia et al. |
| 2005/0143119 | A1 | * | 6/2005 | Chandra et al. ............. 455/522 |

FOREIGN PATENT DOCUMENTS

| EP | 1 494 495 A2 | 1/2005 |
| WO | WO 01-30048 A2 | 4/2001 |

* cited by examiner

*Primary Examiner*—Simon D Nguyen
(74) *Attorney, Agent, or Firm*—Lee, Hong, Degerman, Kang & Waimey

(57) ABSTRACT

A method of executing to battery power consumption between an access terminal (AT) and an access network (AN) in a wireless communication system is disclosed. More specifically, the method includes transmitting a notification message to the AN, receiving a confirmation message from the AN, and entering the power-saving mode according to the determined power saving mode. Here, the notification message includes at least one of battery life information and a power-saving mode request, and the confirmation message includes a determined power saving mode which is based on the at least one of battery life information and the power-saving mode request.

20 Claims, 5 Drawing Sheets

METHOD OF PROVIDING NOTIFICATION FOR BATTERY POWER CONSERVATION IN A WIRELESS SYSTEM

This application claims the benefit of U.S. Provisional Application No. 60/707,919, filed on Aug. 12, 2005, which is hereby incorporated by reference.

BACKGROUND OF THE INVENTION

1. Field of the Invention

The present invention relates to a method of providing notification, and more particularly, to a method of providing notification for battery power conservation in a wireless communication system.

2. Discussion of the Related Art

In a mobile wireless communication system, one very important performance characteristic of wireless devices is power consumption. Users of wireless devices value mobility and therefore place great importance on a long battery life, For example, cell phone users prefer to spend as little time as possible charging their cell phones and prefer cell phones that can operate for long durations before recharging. The same is true for users of laptop computers operating over a wireless network.

To this end, manufacturers are designing wireless devices to enjoy longer battery life. Despite much research into developing devices for extended usage, there is a limit to how long a battery can operate before needing recharging.

To address structural limitations, signaling design can be improved to save battery power in wireless networks. For this, an access terminal (AT), which is also referred to as a mobile station, a terminal, a mobile subscriber station, and a like, and an access network (AN), which is also referred to as a base station, a node, a network, a base terminal station, and a like, need to communicate efficiently and effectively. More specifically, the AT and the AN need to communicate information related to battery power and power saving mode, and accordingly, both need to make decisions that promote longer battery life.

SUMMARY OF THE INVENTION

Accordingly, the present invention is directed to a method of providing notification for battery power conservation in a wireless communication system that substantially obviates one or more problems due to limitations and disadvantages of the related art.

An object of the present invention is to provide a method of executing battery power conservation procedure between an access terminal (AT) and an access network (AN) in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of executing battery power conservation procedure between an access terminal (AT) and an access network (AN) in a wireless communication system includes transmitting a notification message to the AN, receiving a confirmation message from the AN, and entering the power-saving mode according to the determined power saving mode, Here, the notification message includes at least one of battery life information and a power-saving mode request, and the confirmation message includes a determined power saving mode which is based on the at least one of battery life information and the power-saving mode request.

In another aspect of the present invention, a method of executing battery power conservation procedure between an access terminal (AT) and an access network (AN) in a wireless communication system includes receiving a notification message, which includes at least one of battery life information and a power-saving mode request from the AT, and transmitting a confirmation message, which includes a determined power saving mode which is based on the at least one of battery life information and the power-saving mode request, to the AT.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
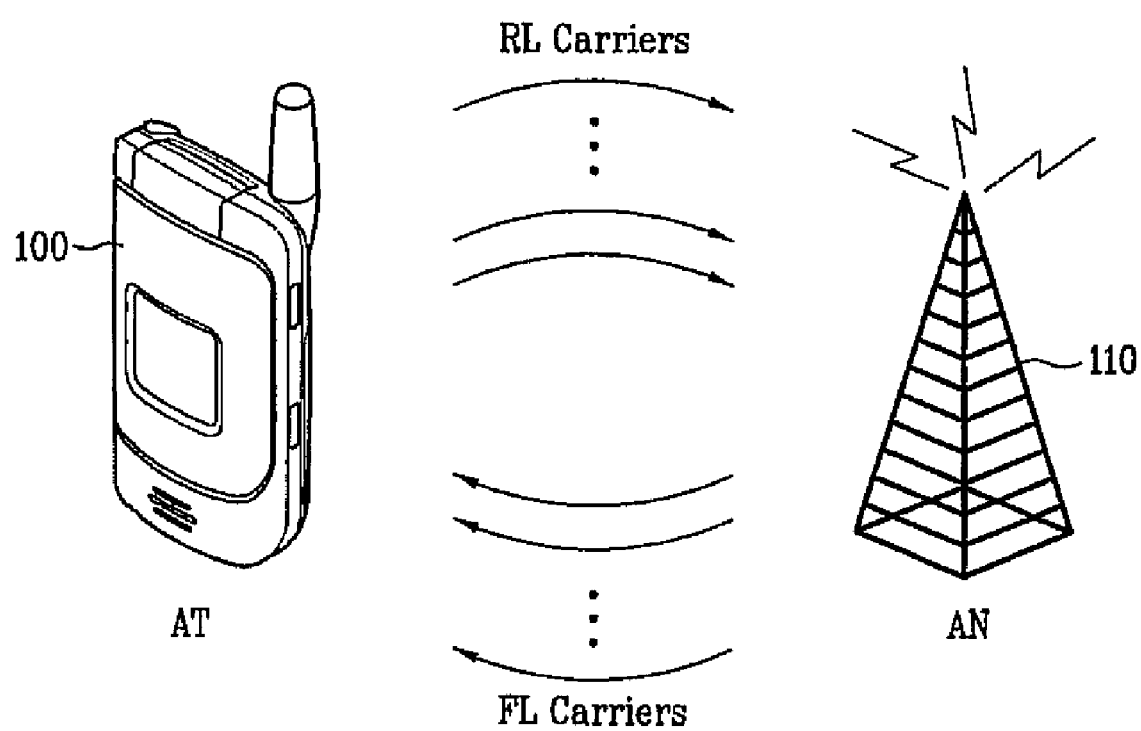
FIG. 1 illustrates a conceptual diagram of a multi-carrier system.

In current systems, which tend to be single-carrier systems, an acceptable amount of overhead and power consumption is often incurred. In a multi-carrier system, it can be expected that significantly greater overhead and power consumption would be incurred per terminal. FIG. 1 illustrates a conceptual diagram of a multi-carrier system. The transmission from an access terminal (AT) 100 to an access network (AN) 110 are via reverse link (RL) carriers while the transmission from the AN 110 to the AT 100 are via forward link (FL) carriers.

With ever increasing demand for more and faster data transmission, similar potential problems can be experienced by most wireless systems, and in particular, $3^{rd}$ Generation Partnership Project (3GPP), 3GPP2, and an Orthogonal Frequency Division Multiplexing (OFDM)-based systems.

By reducing signaling overhead in multi-carrier systems, battery consumption can be reduced, That is, by reducing transmit power and signal processing requirements at the receiving end, battery consumption can be reduced. Here, signaling overhead refers to channel quality information (CQI) feedback from the AT to the AN, for example. In addition, reduction of signaling overhead can reduce interference levels, in turn, increasing system capacity.

Alternatively, a signaling design can be modified and/or improved to reduce battery power consumption. For a signaling design to conserve battery power in a wireless communication system, an AT can send a notification message to an AN to report its battery status. The battery status information includes amount of leftover battery life at the AT. The notification message can further include AT's preferred power saving mode as well as a required power saving mode The preferred power saving mode relates to a paging cycle for receiving paging signals from the AN during idle state or connected state discontinued transmission (DTX) mode or discontinued reception (DRX) mode.

In the idle state, the AT receives a paging message or signal from the AN at specified durations which can also be referred to as paging cycle. Here, the paging cycle can be fixed or variable. As the name suggests, a fixed paging cycle refers to paging messages being transmitted at fixed time intervals whereas a variable paging cycle refers to paging messages being transmitted at non-fixed time intervals, It is during the paging cycle the AT receives the paging message which indicates whether there is any downlink traffic for the AT. For example, the variable paging cycle can be set where time intervals for receiving the paging message increases incrementally based whether there is downlink traffic. To put differently, the duration or length of the idle/sleep mode increase incrementally. More specifically, the paging cycle can increase two-folds for every paging message which fails to contain data for the specified AT until the paging cycle reaches a prescribed maximum paging cycle.

Alternatively, the paging cycle can be adjusted, as discussed, based on leftover battery life of the AT. If the battery power status of the AT indicates low, then the AT can adjust the intervals of the paging cycle to be less frequent than if the battery power status was normal. Moreover, as discussed above, if the battery power is low, the incrementally increasing paging cycle can also be applied. In short, various schemes can be applied to conserve battery power during the idle/sleep mode.

Figure 2:
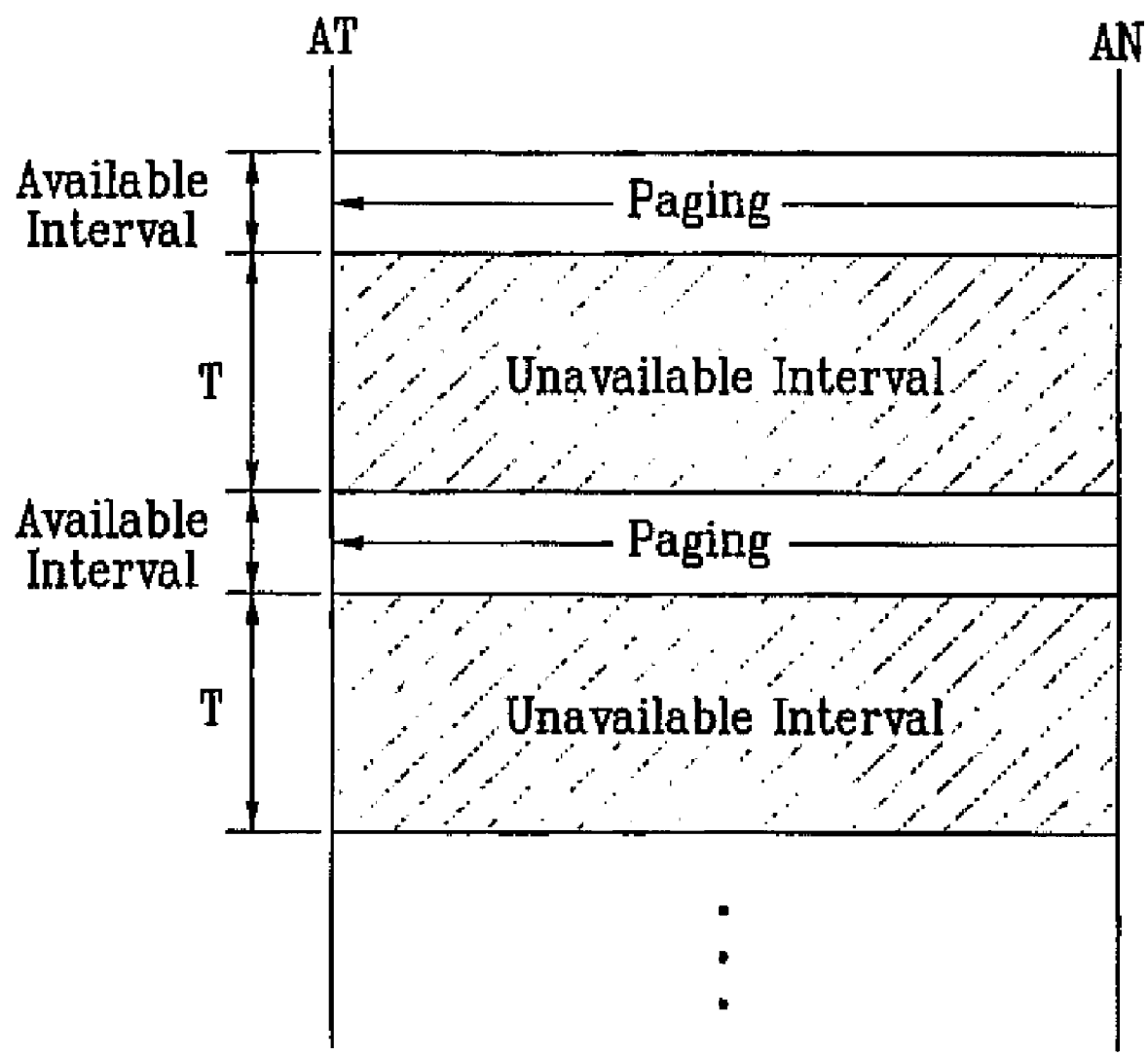
FIG. 2 illustrates an example of a fixed paging cycle.

FIG. 2 illustrates an example of a fixed paging cycle. During the fixed paging cycle, the paging message is transmitted from the AN to the AT during every fixed intervals. The interval during which the AN can send the paging message to notify whether there is any downlink traffic for the AT can also be referred to as an available interval. Conversely, the interval during which the AT remains in idle, sleep, or inactive state (i.e., power saving mode) and cannot receive the paging message can also be referred to as an unavailable interval. Here, the fixed unavailable interval is unavailable for a period of T.

Figure 3:
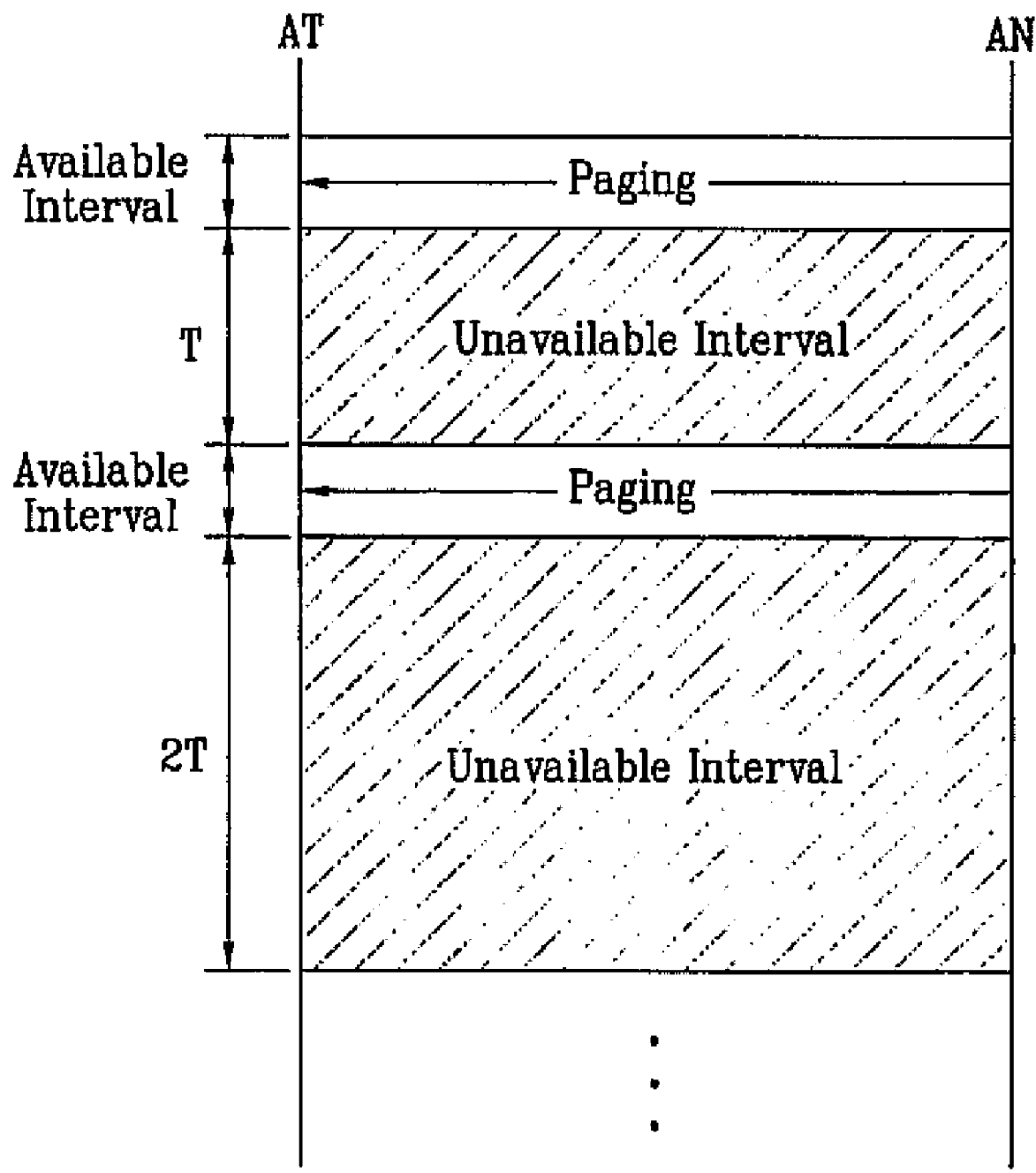
FIG. 3 illustrates an example of a variable paging cycle.

FIG. 3 illustrates an example of a variable paging cycle. During the variable paging cycle, the paging message is transmitted from the AN to the AT during every fixed intervals. Here, however, the difference is that the unavailable interval increases incrementally. For example, referring to FIG. 3, the unavailable interval increases at two-fold increments. That is, for every paging message received without any downlink traffic, the AT is unavailable to receive the paging message for a period twice as long as the previous. Here, T represents the interval for the first unavailable interval and 2T represents the interval for the subsequent unavailable interval. To prevent the AT from being in idle/sleep/inactive state (i.e., power saving mode) for too long, a limit or a maximum T for the unavailable interval can be preconfigured.

On the contrary, if there is downlink traffic addressed to the AT during the paging cycle or the battery power status increases (e.g., battery being recharged) beyond a specified minimum threshold, then the AT can terminate the idle state. Thereafter, the AT can enter a connected state. Here, the connected state refers to an open connection between the AT and the AN.

By reporting types of information such as the battery status and/or preferred power saving mode to the AN, the AN and the AT can cooperatively make intelligent decisions to facilitate the AT's power consumption and usage management. For example, in a connected state, different modes of discontinuous transmission/reception and enhanced silence can be applied to each AT based on characteristics of traffic and the information provided by the AT. Here, the enhanced silence mode refers to an agreement upon a pattern between the AT and the AN in which the AN only sends AT packets on certain interlaces, such that for the rest of the interlaces, the AT does not need to listen to the traffic channel.

Figure 4:
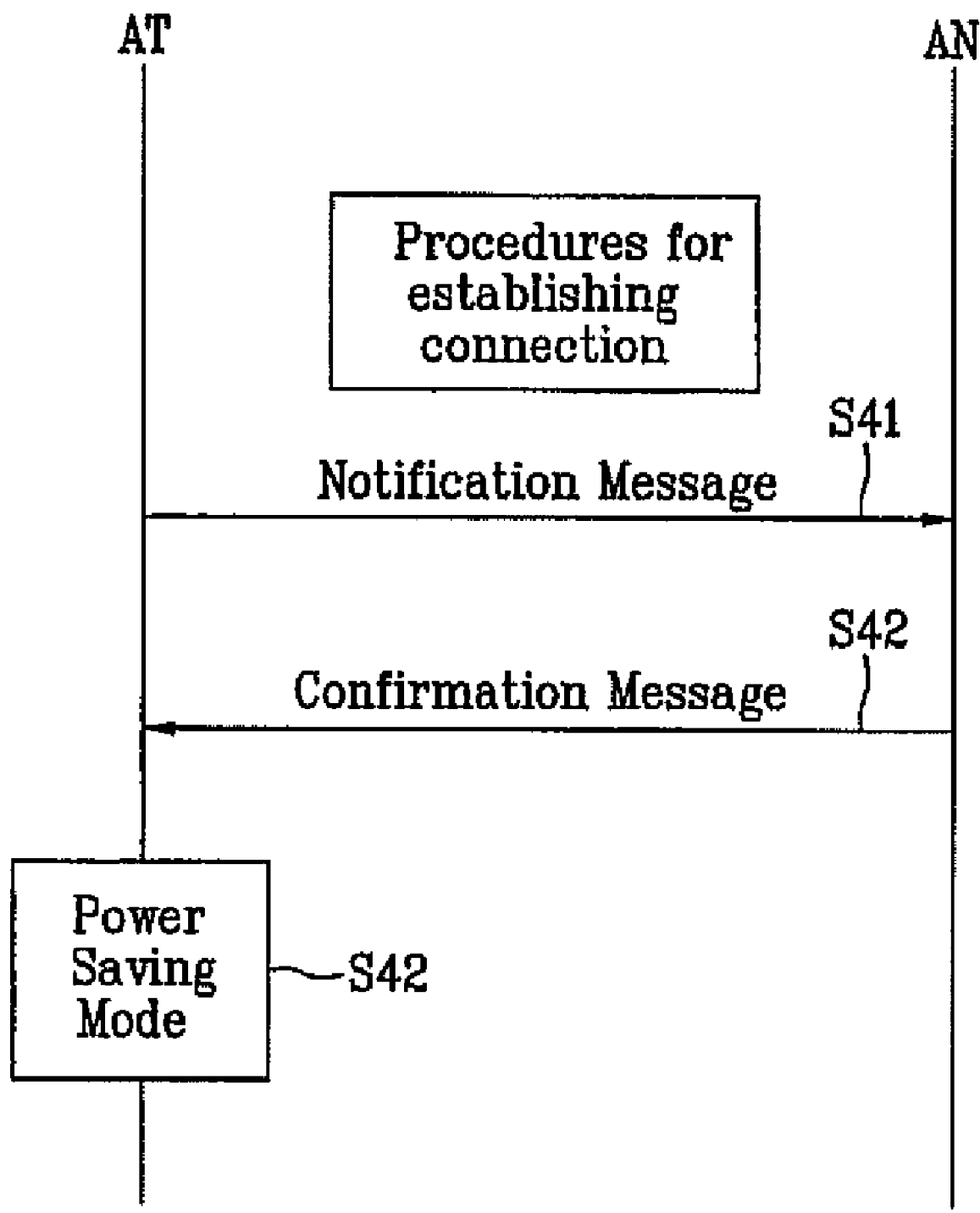
FIG. 4 is an exemplary diagram illustrating the communication between the AT and the AN during connected state.

FIG. 4 is an exemplary diagram illustrating the communication between the AT and the AN during connected state. In the connected state or upon entering the connected state, information of power saving mode can be included in the notification message with different values indicating the preferred mode or the regular mode (S41). The regular mode is particularly important for temporary emergency situations by the AT. Here, if the AT has initiated connection with the AN, then the notification message can be bundled with connection request.

In the connected state, after the AN receives the notification message including power saving mode information, the AN determines the power saving mode for the AT and then sends a confirmation message, including determined power saving mode, to the AT (S42). Thereafter, the AT enters the power saving mode based on the confirmation message (S43).

Further, upon entering idle state, the AN can request for information (e.g., battery status and/or preferred power saving mode) from the AT before a session is configured. When configuring the session, the information then can be used to negotiate the paging cycles or discontinuous transmission/reception as well as enhanced silence, if both the AT and the AN supports the protocols with these features. Transmission of such information can be initiated by the AT or the AN or can also be event driven.

In detail, the notification message can be a RouteUpdate message. The RouteUpdate message includes the means to maintain the route between the AT and the AN as well as the location of the AT. The RouteUpdate message can be used by the AT to provide battery life information and/or preferred power saving mode in the connected state or battery life information in the idle state. The following field, as shown in Table 1, may be included at the end of the RouteUpdate message of any subtype of the route update protocol.

TABLE 1

| Field | Length (bits) |
| --- | --- |
| LeftOverBatteryLifeIndicatorIncluded | 1 |
| LeftOverBatteryIndicator | x |
| PowerSavingModeIncluded | 1 |
| PowerSavingMode | y |

Descriptions of each field are as follows. A "LeftoverBatteryLifeIndicator Included" field is set by the AT and is represented by a single bit. Therefore, if the AT sets this field to '1', it signifies that there is a subsequent "LeftOverBatteryLifeIndicator" field. If the AT sets this field to '0', it means otherwise. The "LeftOverBatteryLifeIndicator" field is an indicator used to indicate amount of leftover battery power at the AT.

The "LeftOverBatteryIndicator" field from an idle AT can be useful for the AN to schedule the AT with longer paging cycles and to notify the caller that it may require more time to get the page response. Further, the "LeftOverBatteryIndicator" field from a connected AT can be used as a criterion for the AN to decide the power saving mode. The AN can also use this information to fine tune the quality of service (QoS) reservations to optimize the AT power management (e.g., low rate vocoder can be selected for voice reservations if the battery power is low). In detail, with the notification from the AT, the AN can make a decision on the tradeoff between power consumption and the QoS on some of the link flow (e.g., voice over internet protocol or video telephony conversation). If the AT's battery power is indicated to be low, the AN may lower the data rate of certain application such that the frequency of the AT monitoring the channel, processing requirements, and the transmission power on AT is reduced along with reduced quality.

Further, LeftOverBatteryIndicator can be defined as a parameter in the session state information. This information can be transferred between the ANs during handoff.

In addition, a "PowerSavingModeIncluded" field is set by the AT and is represented by a single bit. Therefore, if the AT sets this field to '1', it signifies that there is a subsequent "PowerSavingMode" field. If the AT sets this field to '0', it means that there is no subsequent "PowerSavingMode."

The "PowerSavingMode" field can be represented by two types—a preferred power saving mode and a required power saving mode. The preferred power saving mode is a mode which the AT determines to be appropriate, given its current battery power status. That is, the AT considers various factors, including leftover battery, and determines, inter alia, the optimum paging cycle, for example. Here, the value (e.g, γ) of the field can represent the AT's preferred power saving mode for discontinuous reception, either one of the two modes of the enhanced silence with discontinuous reception, or normal operation. The required power saving mode, on the other hand, is another value reserved for a situation where the AT requests for regular mode to be turned on for the temporary emergency situation (i.e. required power saving mode).

The "PowerSavingMode" field may not be needed when the AT is in idle state, in particular, if the notification message is not included in an Access Channel capsule which contains a ConnectionRequest message. In the connected state or when making a connection request, the AT may used this field to indicate its preferred or required power saving mode.

In addition, the AT/AN can use session configuration protocol or Generic Attribute Update Protocol to update the PowerSavingMode attribute to initiate power saving mode switching in the connected state.

If, however, PowerSavingMode is not defined as an attribute, PowerSavingMode can be added as a field of ExtendedRouteUpdate parameter, which is to be moved between source and target ANs if the serving AN changes in the connected state. To put simply, in DO, if something is an attribute, as can be the case with PowerSavingMode, then it is automatically a session state information record (SSIR) which can be transferred from one AN to another. In the case where PowerSavingMode is not defined as an attribute, for example, then a field in SSIR may be explicitly defined to be transferred from source AN to target AN.

In the connected state or upon receiving a ConnectionRequest message from the AT, the AN can use various information to determine which power saving mode to turn on. As discussed above, the AT can send its request for a preferred power saving mode to the AT when connected or when making the connection. However, the AN does not have to follow the request but can make the determination as to which power saving mode to use while taking the request into consideration. In addition to the preferred power saving mode request, the AN can also consider leftover battery life provided from the "LeftOverBatteryIndicator" field, and its forward link backlog associated with the AT, among other information.

After the AN determines which power saving mode to use, the AN can deliver this information (e.g., confirmation message) using the fields shown in Table 2.

TABLE 2

| Field | Length (bits) |
| --- | --- |
| PowerSavingModeIncluded | 1 |
| PowerSavingMode | y |

The fields provided in Table 2 may be included at the end of a TrafficChannelAssignment message of any subtype of the route update protocol. This message is used to assign the power saving mode determined by the AN to the AT.

Alternatively, a power saving mode attribute can be defined for the physical and/or Medium Access Control (MAC) layer protocol which is capable of discontinuous reception/transmission and enhanced silence mode. Moreover, the AT/AN can use Sesson Configuration Protocol or Generic Attribute Update protocol to configure this attribute and negotiate the power saving mode.

As discussed earlier, one of the "PowerSavingMode" value is the normal operation (e.g., associated with the required power saving mode). The AN can assign this mode to the AT if the battery power is not a concern or to avoid the forward link bandwidth reduction when the reverse link frame offsets are unbalanced.

Figure 5:
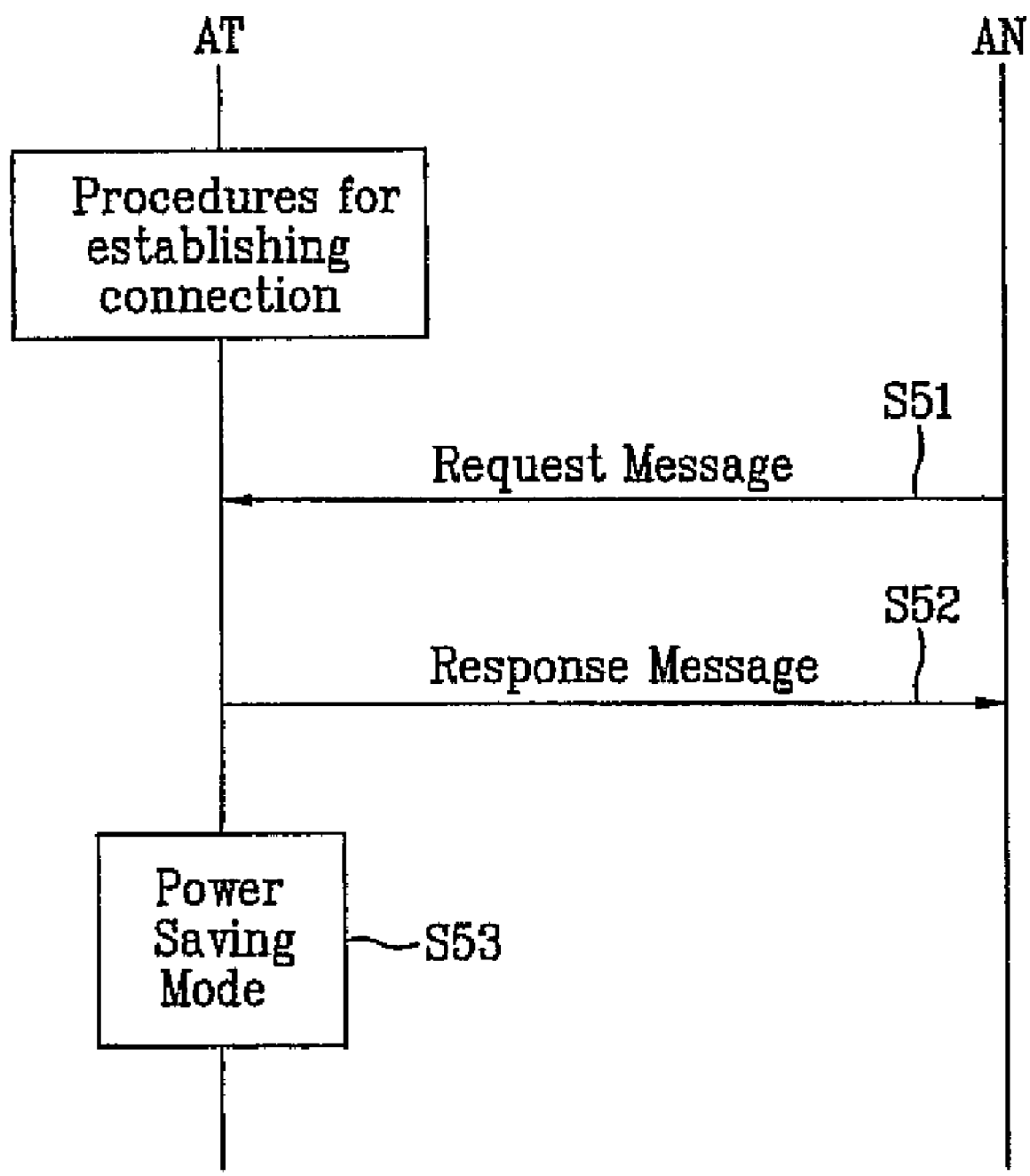
FIG. 5 is another exemplary diagram illustrating communication between the AT and the AN during the connected state.

Alternatively, it is possible for the AN to initiate and send a request for battery power information and preferred power saving mode from the AT. FIG. 5 is an exemplary diagram illustrating communication between the AN and the AT. For this, the AN can send a request message to the AT (S51). This message can be referred to as a RouteUpdateRequest message. The RouteUpdateRequest message can include the following fields, as shown in Table 3.

TABLE 3

| Field | Length (bits) |
| --- | --- |
| LeftOverBatteryLifeIndicatortobeIncluded | 1 |
| PowerSavingModetobeIncluded | 1 |

As depicted in Table 3, the AN requests to the AT to send information on how much battery power is remaining at the AT (i.e., LeftOverBatteryLifeIndicator) and/or AT's preferred or required power saving mode (i.e., PowerSavingMode). In response to the request message, the AT can send a response message during the connected state providing the AN with response to the requested information regarding battery power and/or preferred power saving mode (S52). Thereafter, the AT can enter power saving mode (S53).

In the idle state, AN can base on the LeftOverBatteryLife of an AT to determine that whether the AT should listen to the Quick Paging Channel. For example, for an AT uses AC power, the AN does not hash the AT into the Quick Paging Channel when page arrives. This can reduce the false alarm of other battery constrained ATs when they observe that their Quick Paging Indication is set on Quick Paging Channel and then try to stay in the monitor state to decode the page message which is not for them In the discussion of above, the AT can also be referred to as a mobile station, a mobile subscriber station, a terminal, a mobile terminal, and a like. Further, the AN can also be referred to as a node, a base station, a base subscriber station, a base terminal, a base terminal station, and a like, It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of executing battery power conservation procedure between an access terminal (AT) and an access network (AN) in a wireless communication system, the method comprising:
    transmitting a notification message to the AN, wherein the notification message includes at least one of battery life information and a power-saving mode request;
    receiving a confirmation message from the AN, wherein the confirmation message includes a determined power saving mode based on the at least one of battery life information and the power-saving mode request; and
    entering the power-saving mode according to the determined power saving mode,
    wherein the notification message further includes a LeftOverBatteryIndicatorIncluded field, a LeftoverBatteryLifeIndicator field, a PowerSavingModeIncluded field, and a PowerSavingMode field.

2. The method of claim 1, wherein the power-saving mode request includes a paging cycle index.

3. The method of claim 1, wherein the battery life information includes an amount of leftover battery power.

4. The method of claim 1, wherein the battery life information is used to fine tune quality of service (QoS) reservations.

5. The method of claim 1, wherein the notification message is a route update message.

6. The method of claim 1, wherein each of the LeftOverBatteryIndicatorIncluded field and the PowerSavingModeIncluded field is represented by a single bit.

7. The method of claim 1, wherein the PowerSavingMode field conveys information regarding requested paging cycle, usage of Quick Paging Cycle, and discontinuous transmission/reception preferred by an access terminal (AT) and a discontinuous transmission and reception, and an enhanced silence.

8. The method of claim 1, wherein the PowerSavingMode field includes a request by an access terminal (AT) for an emergency-fall-back-to-regular mode.

9. The method of claim 8, wherein the emergency-fall-back-to-regular mode is invoked when the AT has data to send to the AN.

10. The method of claim 1, wherein the confirmation message includes a PowerSavingModeIncluded field and a PowerSavingMode field.

11. The method of claim 10, wherein the PowerSavingModeIncluded field is represented by a single bit.

12. The method of claim 10, wherein the PowerSavingMode field conveys information regarding requested paging cycle, usage of Quick Paging Cycle, and discontinuous transmission/reception to be determined by the AN based on the at least one of battery life information, the power-saving mode request, and information on forward link backlog associated with the AT.

13. The method of claim 1, further comprising:
    receiving a request message from the AN, wherein the request message includes a LeftOverBatteryLifeIndicatortobeIncluded field and a PowerSavingModetobeIncluded field.

14. The method of claim 13, wherein each of the LeftOverBatteryLifeIndicatortobeIncluded field and the PowerSavingModetobeIncluded field is represented by a single bit.

15. A method of executing battery power conservation procedure between an access terminal (AT) and an access network (AN) in a wireless communication system, the method comprising:
    receiving a notification message from the AT, wherein the notification message includes at least one of battery life information and a power-saving mode request; and
    transmitting a confirmation message to the AT, wherein the confirmation message includes a determined power saving mode based on the at least one of battery life information and the power-saving mode request,
    wherein the notification message further includes a LeftOverBatteryIndicatorIncluded field, a LeftoverBatteryLifeIndicator field, a PowerSavingModeIncluded field, and a PowerSavingMode field.

16. The method of claim 15, wherein information on the LeftOverBatteryLifeIndicator field is transferred between a serving AN and a target AN when the AT moves to the target AN.

17. The method of claim 16, wherein the serving AN is the AN which is currently serving the AT.

18. The method of claim 16, wherein the target AN is an AN by which the AT is seeking to be served.

19. The method of claim 15, wherein the power saving mode relates to shutting down part of the AT's subsystems to conserve power for a specified duration.

20. The method of claim 19, further comprising transmitting a request message to the AT, wherein the request message includes a LeftOverBatteryLifeIndicatortobeIncluded field and a PowerSavingModetobeIncluded field.

* * * * *